Aug. 26, 1924.
N. D. STURGES
BATTERY
Filed Nov. 29, 1922
1,506,390
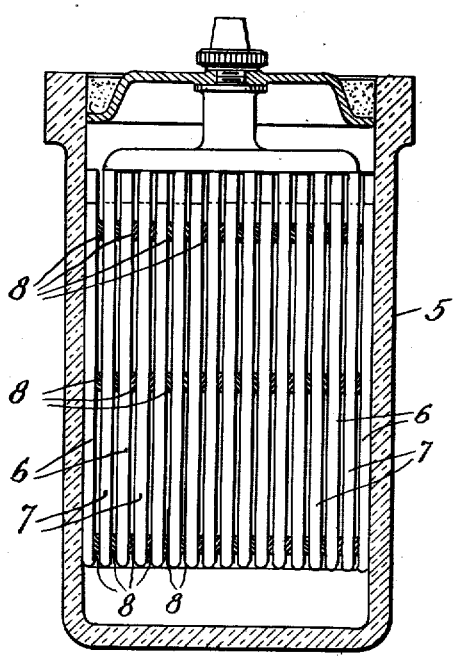
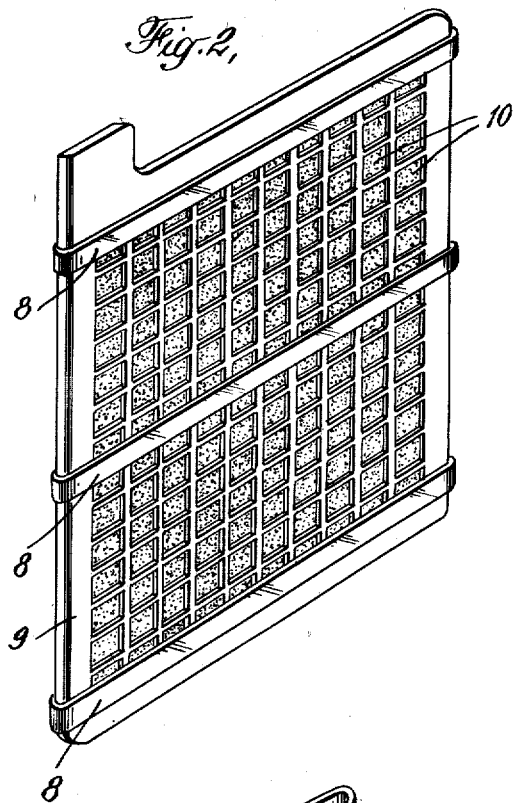
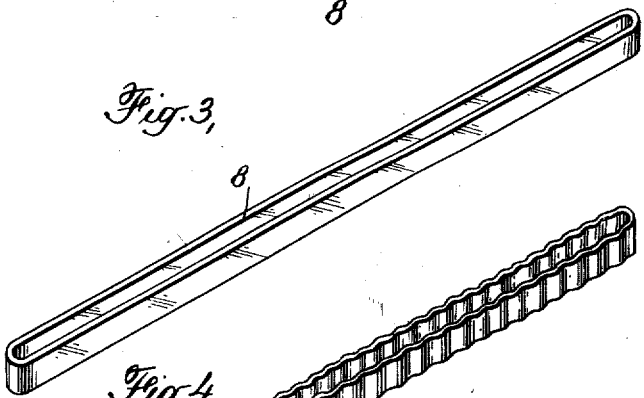
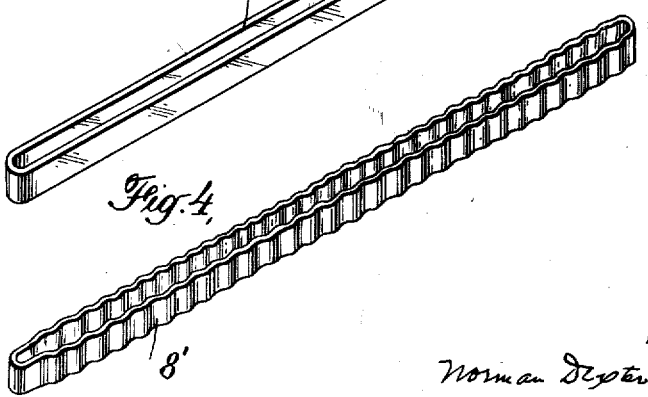
INVENTOR
Norman Dexter Sturges
BY
his ATTORNEYS Patented Aug. 26, 1924.

1,506,390

UNITED STATES PATENT OFFICE.

NORMAN DEXTER STURGES, OF BELLEROSE, NEW YORK.

BATTERY.

Application filed November 29, 1922. Serial No. 603,895.

*To all whom it may concern:*

Be it known that I, NORMAN DEXTER STURGES, a citizen of the United States, residing at Bellerose, in the county of Nassau, State of New York, have invented certain new and useful Improvements in Batteries; and I do hereby declare the following to be a full, clear, and exact description of the invention, such as will enable others skilled in the art to which it appertains to make and use the same.

This invention relates to storage batteries, and particularly to means therein whereby difficulties heretofore experienced with such batteries may be avoided or eliminated.

One of the essential features of most storage batteries is the separator which is employed between each pair of elements, positive and negative. These separators are generally made of wood although sometimes constructed of hard rubber. The separators deteriorate more rapidly than the battery elements, are readily broken when the battery is disassembled for inspection or repair, very materially increase the internal resistance of the battery, and, in the case of wood, contaminate the electrolyte. Wood separators are particularly undesirable when used with jelly electrolytes. This is probably due to the fact that soluble organic substances in the wood which are dissolved by the electrolyte are not disseminated through the mass of jelly electrolyte so readily as in the case of liquid electrolytes.

It is the object of the present invention to avoid the use of separators by employing insulating bands of celluloid or equivalent material. In addition to overcoming the disadvantages hereinbefore described, these bands have the advantage of facilitating the manufacture and assembly of the battery elements. The cost of production of batteries is thus lessened and a more substantial and lasting battery is provided.

Further objects and advantages of the invention will be apparent as it is better understood by reference to the following specification and accompanying drawing, in which—

Fig. 1 is a view partially in section of a storage battery embodying the invention;

Fig. 2 is a view in perspective of a battery element or plate with the bands applied thereto;

Fig. 3 is a view in perspective of a band of celluloid or equivalent material; and Fig. 4 is a view in perspective of a slightly different form of insulating band.

In carrying out the invention I prefer to employ celluloid in preparing the insulating bands for the reason that this material is resistant to acids and has the proper degree of elasticity to permit application of the band to the battery element or plate and retention of the band in its proper position throughout the life of the battery. The band may be an endless flat strip of celluloid or it may be corrugated, the latter form being preferred because the band may be made of thinner material while ensuring the proper distance between the battery elements or plates. The bands are preferably applied to the positive elements or plates for the reason that this arrangement permits the assembly of the battery in a jar of normal size in which there are usually an even number of positive plates and an odd number of negative plates. Of course, the bands may be applied to the negative plates, but in this case it may be necessary to modify the size of the battery jar to meet the changed dimensions of the battery elements. By reference to a jar of normal size it is assumed that the bands are to be substituted for separators in a standard battery.

Otherwise than in the substitution of insulating bands for the separators, the battery may be substantially identical in its structural features with ordinary storage batteries. It may consist of a plurality of plates made up of the usual lead grids with a mixture of red lead and litharge pasted thereon. The bands may be applied either before or after the forming operation in which the pasted material on the positive plate is changed to peroxide of lead and that on the negative plates is reduced to spongy lead. The number of celluloid bands employed may vary, it being preferable to employ at least two bands, one at the top and one at the bottom of each positive plate, and if the plate is large a third band may encircle it at about the centre. The plates are assembled in the usual jar, the negative and positive plates alternating and the bands preventing contact of the plates of opposite polarity.

The invention is particularly desirable in connection with the use of jelly electrolytes.

A suitable electrolyte for the purpose may be prepared by mixing silicate of soda 8.3° Bé. and sulfuric acid 35.2° Bé. in the proportion of one part by volume of silicate of soda to 1.7 parts by volume of sulfuric acid. Such a mixture may be poured into the battery until it covers the plates and allowed to jell. Of course, the composition described is merely illustrative and may be varied as to proportions and ingredients, the jelly electrolytes being well known in the art. With such electrolytes, which are highly desirable in many types of batteries, particularly those used in automobiles, the use of insulating bands in place of separators permits reduction of the internal resistance of the battery to a minimum. Such batteries will stand heavy overcharges and abnormally high discharging rates without the disintegration which usually accompanies such abuse of ordinary storage batteries.

As to general advantages of the insulating bands, it will be noted that the bands may be applied to the plates before they are formed, and in the assembly of batteries the handling of separators and losses through breakage thereof are eliminated. Moreover, new separators are never required in batteries embodying the present invention.

Referring to the drawing, 5 indicates a container of suitable form and dimensions, the container being made of glass, vulcanized rubber, or other acid-resistant material. Within the container a plurality of negative plates 6 and positive plates 7 are held. The positive plates 7 are embraced by bands 8 of suitable material, preferably celluloid. Two or more such bands may be employed, depending upon the size of the plates. As will be seen by reference to the drawing, the bands 8 on the positive plates serve as insulators to hold the positive and negative plates in spaced relation. The container 5 is filled with a suitable electrolyte, preferably a jelly electrolyte such as has been hereinbefore described. The plates 6 and 7 may consist of the usual lead grids 9 with the active material 10 pasted thereon and are preferably in every respect similar to standard plates such as are used in most storage batteries.

In Fig. 3 of the drawing a celluloid band 8 is illustrated in perspective. It is preferably a flat endless strip of suitable thickness to provide the required spacing between the positive and negative plates. This thickness may vary, but is preferably in the neighborhood of one-sixteenth inch. The width of the bands may also vary, but a width of three-sixteenths inch is satisfactory in an ordinary battery. The band is of such length as to slip edgewise over the plate. It may be necessary to warm the bands and expand them slightly before they are applied to the plate so that they will be held in place by friction after they have been applied.

In Fig. 4 of the drawing a slightly different band 8' is illustrated which is made of a thinner celluloid and corrugated so as to provide the desired spacing of the positive and negative plates. The corrugated band has the advantage of being capable of slight elongation in applying the band to the plate. It has the further advantage that gases generated in the bottom of the battery pass readily upwardly through the corrugations of the band which do not, interfere, therefore with the escape of the generated gases.

Other advantages in addition to those already mentioned may result from the application of the invention, and various changes may be made in the details of its application without departing from the invention or sacrificing any of the advantages set forth.

I claim:—

1. A plate for storage batteries carrying active material and provided with a band of celluloid embracing the same and serving as the sole separator when the plate is used with other plates in a storage battery.

2. In a storage battery, the combination of a plurality of plates carrying active material and celluloid bands embracing at least some of the plates and acting as separators to hold them in spaced relation.

3. In a storage battery, the combination of a plurality of plates carrying active material and corrugated bands of acid-resisting insulating material embracing the plates to hold them in spaced relation.

4. In a storage battery, the combination of a plurality of plates carrying active material and corrugated bands of celluloid embracing the plates to hold them in spaced relation.

5. An insulating band for storage battery plates consisting of an endless transversely corrugated strip of acid-resisting insulating material adapted to embrace a single plate.

6. An insulating band for storage battery plates consisting of an endless transversely corrugated strip of celluloid adapted to embrace a single plate.

7. In a storage battery, a plate carrying active material and having one or more endless bands of transversely corrugated acid-resisting insulating material disposed thereabout.

In testimony whereof I affix my signature.

NORMAN DEXTER STURGES.